United States Patent Office 3,050,364
Patented Aug. 21, 1962

3,050,364
PURIFICATION OF SAND CONTAINING COLOUR-IMPARTING IMPURITIES
Herbert Daymond Segrove, Redhill, England, assignor to British Industrial Sand Limited, Redhill, England, a British company
No Drawing. Filed Nov. 5, 1956, Ser. No. 620,190
Claims priority, application Great Britain Nov. 7, 1955
10 Claims. (Cl. 23—182)

This invention relates to the treatment of sand in order to reduce the iron content thereof.

It is well recognised that the iron content of sand must be reduced to a very low level in order to render it acceptable to the glass-making industry. The presence of iron imparts a green colour to glass even when present in small quantities.

There are considerable quantities of sand available which would be suitable for glass making if the iron content thereof could be readily reduced to an acceptable level. A number of processes have been proposed for this purpose and some of these have met with a considerable measure of success.

Among the most successful processes is that described in my prior United States Patent No. 2,583,280 according to which sand having a ferruginous coating is treated with a dilute aqueous solution of hydrofluoric acid and an alkali metal hydrosulphite or hydrosulphurous acid. However, there are some sands which, whilst showing a very substantial reduction in iron content when subjected to this process under standardised conditions which are entirely satisfactory with many other sands, still have an undesirably higher residual iron content. This does not mean that by altering the conditions, e.g., prolonging the sojourn in the treatment chamber, the results cannot be improved but this reduces the economic value of the process.

Further investigation has also indicated that the iron is not always present in the same condition and the geological history of the contamination is revealed as an important factor. A deposit of sand may, during the course of its geological history, have been subjected to more than one incident which has resulted in contamination with iron and it follows that the same treatment may not be equally successful in removing each kind of contamination. It is equally evident that different parts of a single deposit may have been subject to different sources and different degrees of contamination during their geological history.

Such considerations as the foregoing render it desirable to have alternative processes available for the treatment of iron-contaminated sand upon which an adequate degree of purification cannot be achieved under standardised conditions.

It is the object of the present invention to provide such a process.

Attempts have already been made to use hydrogen chloride as a reagent for removing iron from sand. Ammonium chloride has been used at a temperature above its dissociation temperature into ammonia and hydrogen chloride and it has also been used together with free hydrogen chloride at bright red heat. Such processes depend essentially upon the volatilisation of ferric chloride and, on account of the heavy fuel consumption, they are quite uneconomic.

According to the present invention there is provided a process for the removal of ferruginous material from sand which comprises admixing substantially dry, washed sand with substantially dry gaseous hydrogen chloride at a temperature below 250° C. and washing the treated sand with water.

The process can be carried out in two different manners. In one of these gaseous hydrogen chloride is led into a mass of dry, washed sand which may be maintained in static or dynamic condition while in the other the gaseous hydrogen chloride is generated in situ from strong hydrochloric and strong sulphuric acids and thoroughly admixed with the sand grains.

In that form of the process in which gaseous hydrogen chloride is used it is preferably brought into contact with heated, dry washed sand at a temperature below 200° C. Desirably the temperature does not exceed 120° C. and for most materials the preferred range is 70 to 100° C. but some materials give better results at higher temperatures.

Apparently the geological history of the contamination affects the temperature at which the treatment is best carried out. It is known that the main contamination is due to hydrated ferric oxide and that the degree of hydration seems to vary. The extent of the contamination is considered to affect the properties of the individual sand grains. Silica is known to hold adsorbed water tenaciously up to temperatures of at least 500° C. In past ages there is every reason to believe that the silica may have been at temperatures above 500° C. and may have been in contact with ferric oxide at those temperatures. This will affect the properties of the surface both as regards the silica and the ferric oxide. It is thus readily apparent that there are many unknown and yet unappreciated factors involved and it is not surprising that different deposits of sand which are contaminated with iron require different treatments.

In one method of performing the invention the dry sand to be treated may be placed in a glass or stoneware vessel which is then partially or wholly evacuated and heated to the desired temperature. Gaseous hydrogen chloride is then introduced in an amount sufficient to give a predetermined initial pressure thereof in the vessel. The pressure in the vessel may thus be restored to atmospheric pressure or it may be brought to a lower or higher initial pressure. When a manometer is attached to the vessel a gradual fall in pressure is observed until a steady figure is finally obtained. The treatment may then be regarded as complete.

In another method of performing the invention the dry sand may be introduced at one end into a pipe fitted with an Archimedean screw. The pipe is heated externally (or alternatively the sand is preheated and the pipe jacketed) and gaseous hydrogen chloride is introduced into the pipe at the opposite end to the sand. The turning of the screw consistently exposes fresh surfaces of the heated sand to the hydrogen chloride as it is moved along the length of the pipe in countercurrent relation thereto. At the end of the pipe the sand may fall into a hopper from which it may be removed from the system if the treatment has been completed or returned for re-passage through the pipe or fed into the next of a series of pipes in which the treatment is continued in similar manner. If a single pipe is used the rate of introduction of the hydrogen chloride should be such that it is substantially all consumed therein. If a series of connected pipes are used the rate of introduction should be such that there is substantially no hydrogen chloride in the exit gases from the system.

It is important that the sand should be as dry as possible since hydrogen chloride is readily dissolved in any moisture present.

A convenient method of generating hydrogen chloride for use in this form of the process is by the interaction of chlorosulphonic acid and concentrated hydrochloric acid. The sulphuric acid concomitantly produced as useful in the flotation step to which the treated sand is usually subsequently subjected.

It has been found that sand having a ferric oxide content of 0.1% requires approximately 2 lbs. of gaseous hydrogen chloride per ton for treatment.

Most of the sands so far tested have given best results when the treatment has been carried out at 80–90° C.

In that form of the process in which hydrogen chloride is generated in situ from strong hydrochloric and strong sulphuric acids the substantially dry, washed sand is admixed with the acids so that the temperature of the resulting admixture does not exceed 100° C.

This form of the process can be carried out at temperatures from room temperature upwards. Since, however, the sand has to be heated in order to dry it it is preferred to use the heated sand direct from the drier. The present process proceeds much more rapidly at temperatures of 60 to 100° C. than at lower temperatures and accordingly the temperature of the sand employed is preferably such that after admixture with the hydrochloric and sulphuric acids the temperature of the mixture is within the stated range.

It is considered that the sulphuric acid serves to dehydrate the hydrochloric acid while simultaneously undergoing partial dilution. It is therefore necessary so to adjust the proportions of the two acids as to ensure that the sulphuric acid does not become unduly diluted. Good results have been obtained when the weight of water derivable from the hydrochloric acid has not substantially exceeded 25% of the weight of the concentrated sulphuric acid (98% acid) employed. When the weight of water derivable from the hydrochloric acid exceeds 30% of the concentrated sulphuric acid the results are less satisfactory. At the temperatures envisaged the action of the hydrated sulphuric acid on the sand is extremely slow.

A minimum quantity of hydrochloric acid is also necessary to achieve satisfactory purification and this appears to be about 0.5% by weight of the weight of the sand employed. It will be appreciated that the proportion depends upon the size of the sand grains: the proportion given is that applicable to sand of the usual particle sizes used for glass making. A suitable quantity of concentrated hydrochloric acid is 5 ccs. per kilogram of sand undergoing treatment but twice this quantity may be employed provided the amount of sulphuric acid is correspondingly increased so as to maintain the weight of water derivable therefrom within the above indicated limits. When 5 ccs. of concentrated (37%) hydrochloric acid is used a convenient quantity of 98% sulphuric acid is 8 ccs. If the sulphuric acid is of lower concentration a larger amount is necessary and it is preferred not to employ sulphuric acid of less than 90% concentration.

After mixing thoroughly with the acids the sand may be left in a closed container for a suitable period of time. Such container may be jacketed if desired and a heating medium may circulate through the jacket if it is desired to maintain the temperature of the sand undergoing treatment within a desired range. Alternatively, the sand may be placed together with the acids in a closed container and the latter then tumbled.

It is essential that the treatment with hydrogen chloride precede the flotation step when this latter is also required since it has been found that sand which has first been subjected to flotation to remove mineral grains is inactivated thereby. It is assumed that molecular layers of the anionic flotation agent employed are then adsorbed upon the surface of the contaminating material.

When, after treatment with gaseous hydrogen chloride, the sand is subsequently washed, the water is found to be slightly acid and contains a suspension of finely divided ferric oxide. This appears to indicate that the direct product of the reaction is ferric chloride (probably in the form of the monohydrate).

Washing of the treated sand should precede any flotation step designed to remove ferruginous and like minerals. This prevents any tendency for the iron compounds to be redeposited upon the silica, reduces the consumption of flotation agents to a minimum, and avoids any flotation of silica which may occur from such redeposition of iron compounds. For this purpose any conventional anionic froth flotation agent, such as mahogany sulphonate, may be employed. The flotation is carried out at an acid pH, preferably between 1.5 and 2.3.

The following examples illustrate the nature of the invention.

*Example 1*

A washed sand originating in Surrey was placed in a dry vessel, which was then heated to 80° C. whilst being evacuated. Hydrogen chloride gas was then introduced to a pressure of 500 mm. and allowed to remain in contact therewith until there was no change in the level of a manometer during several minutes. The time of treatment was 15 minutes. The material was then subject to water washing followed by froth flotation using an anionic flotation agent.

The initial material contained 0.12% of ferric oxide: the treated product contained 0.03%.

When the pressure of hydrogen chloride introduced was lower there was less removal of ferric oxide but the rise in ferric oxide content was not proportional to the drop in pressure.

*Example 2*

Another washed sand originating in Surrey was employed following the general method outlined in Example 1 but varying the temperature of treatment, the initial pressure of hydrogen chloride and the time of treatment. The results obtained are set forth in the appended table:

| Temperature, °C. | Initial pressure of HCl mm. | Time, Mins. | Fe$_2$O$_3$ after flotation, percent |
|---|---|---|---|
| 40–45 | 191 | 35 | 0.034 |
| 60 | 279 | 30 | 0.021 |
| 80 | 199 | 25 | 0.021 |
| 80–90 | 480 | 25 | 0.015 |
| 120 | 221 | 12 | 0.026 |
| 150 | 202 | 36 | 0.040 |

The initial material contained 0.096% of ferric oxide and it will be seen that it was readily possible to reduce this by more than 75%. Curiously the highest temperature tried did not give the best results.

When the same material was treated under standard processing conditions with the hydrofluoric acid-alkali hydrosulphite reagent the ferric oxide content only fell to 0.05%.

*Example 3*

A washed sand originating in East Anglia was employed following the general method outlined in Example 1. Employing temperatures of 60–80° C., hydrogen chloride concentrations of 300–720 mm. and times of 15–30 minutes, the residual ferric chloride content was, within the limits of experimental error, the same as that obtained with the hydrofluoric acid-alkali metal hydrosulphite process (0.032%).

*Example 4*

Another washed sand originating in East Anglia was employed having a ferric oxide content of 0.057%. A sample of this when treated under the standard conditions used in the hydrofluoric acid-alkali metal hydrosulphite process gave a residual ferric oxide content of 0.03%. Following the general procedure outlined in Example 1 samples were treated at different temperatures and pressures and for different times with the following results:

| Temperature, °C. | Initial pressure of HCl mm. | Time, Mins. | Fe$_2$O$_3$ after flotation, percent |
|---|---|---|---|
| 40–45 | 220 | 30 | 0.029 |
| 60–65 | 217 | 20 | 0.032 |
| 80 | 240 | 20 | 0.034 |
| 80 | 489 | 21 | 0.030 |
| 120 | 207 | 15 | 0.034 |
| 150 | 205 | 20 | 0.034 |

These results are regarded, within the limits of experimental error, as being as good as those obtained under the standard conditions. It will, however, be seen that there does not appear to be any advantage in taking the temperature above about 100° C. in this particular case.

*Example 5*

A current of hydrogen chloride gas was passed through a column containing heated ground sandstone from Staffordshire. The column was maintained at a temperature of approximately 100° C. When the colour of the sand did not undergo any further change at the end of the column remote from the point of introduction of hydrogen chloride the material was removed from the column, washed with water and then subjected to froth flotation using an anionic collecting agent. The passage of the gas was accompanied by a lightening of the colour of the material undergoing treatment. The ferric oxide content of the treated material after flotation was found to be 0.034%, the initial content being 0.16%. Treatment by attrition at an initial pH of substantially 2 which was the best method hitherto known for treating this material gave a material which in different tests had 0.05 to 0.06% residual ferric oxide.

*Example 6*

A specimen of the same sand as that used in Example 2 was processed in a column as described in Example 5. The temperature of the column was maintained at 80° C. After washing and flotation the ferric oxide content of the sand was 0.017%.

*Example 7*

A washed, dried sand originating in East Anglia was employed: it had a ferric oxide content of 0.17%. Portions of sand were mixed with concentrated hydrochloric acid and sulphuric acid (98%) in the noted proportions and then allowed to stand for 90 minutes at room temperature. The treated sand was then subjected to washing with water followed by froth flotation using an anionic flotation agent.

| Run | Reagents per kilo | | $Fe_2O_3$ after flotation percent |
|---|---|---|---|
| | 11 N hydrochloric acid, cc. | Concentrated sulphuric acid, cc. | |
| a | 4 | 6 | 0.047 |
| b | 5 | 8 | 0.043 |
| c | 6 | 6 | 0.048 |
| d | 6 | 8 | 0.055 |
| e | 10 | 16 | 0.040 |

It will be seen that runs b and e gave the best results, but in run e the amount of acids is twice that used in run b: in both these runs the water derivable from the hydrochloric acid is about 25% by weight of the weight of the sulphuric acid employed.

*Example 8*

Sand similar to that used in Example 7 was employed and the proportions of reagents were the same as in *b* above but the treatment was carried out at 70° C. for 10 minutes. The treated sand was washed and subjected to froth flotation as described in Example 7. The residual ferric oxide content was 0.041%.

Another specimen was treated with gaseous hydrogen chloride, then washed with water and subjected to froth flotation: the residual ferric oxide content was 0.039%. The results of the two procedures are regarded as equally good within the limits of experimental error.

*Example 9*

The sand employed was one of East Anglian origin which, after washing and drying had a ferric oxide content of 0.065%. Three runs were carried out under different conditions using 5 cc. of 11 N hydrochloric acid and 8 cc. of concentrated sulphuric acid per kilogram of sand:

(a) The mixture was allowed to stand at room temperature for 90 minutes.

(b) The mixture was tumbled at room temperature for 30 minutes.

(c) The mixture was tumbled at 70° C. for 10 minutes.

The mixtures were then washed and subjected to froth flotation as before. The residual ferric oxide contents were, respectively 0.038%, 0.044% and 0.033%.

*Example 10*

Another sample of the sand used in Example 9 was allowed to stand at room temperature with 10 cc. of 11 N hydrochloric acid and 16 cc. of concentrated sulphuric acid per kilogram for 90 minutes. The mixture was then washed and subjected to froth flotation. The residual ferric oxide content was 0.028%. The same result was obtained with gaseous hydrogen chloride.

*Example 11*

A washed, dried sand originating in Surrey was employed. Three runs were carried out using 5 cc. of 11 N hydrochloric acid and 8 cc. of concentrated sulphuric acid per kilogram of sand:

(a) The mixture was allowed to stand at room temperature for 30 minutes.

(b) The mixture was allowed to stand at room temperature for 90 minutes.

(c) The mixture was tumbled for 10 minutes at 70° C.

The mixtures were washed and subjected to froth flotation. The residual ferric oxide contents were, respectively, 0.030%, 0.026% and 0.031%. Before treatment the sand contained 0.064% of ferric oxide.

During the course of the treatment it has been noted that the colour of the sand changes. Depending upon the initial iron content the sand fed to the process is yellow to red in colour. During the course of the treatment it changes to white to greenish yellow.

Other colour-producing impurities such as chromium are removed simultaneously during the flotation step when present in the sand undergoing treatment.

I claim:

1. A process for rendering high silica sand, containing ferric oxide as an impurity, suitable for glass-making which comprises contacting at a temperature below 250° C. (a) substantially dry washed sand grains contaminated with ferric oxide as an impurity with (b) substantially dry gaseous hydrogen chloride until change in color of the sand grains substantially ceases, thereby indicating that the reaction which occurs is substantially complete, and washing the resulting sand with water.

2. A process for rendering high silica sand, containing ferric oxide as an impurity, suitable for glass-making which comprises (I) contacting at a temperature below 200° C. (a) dry washed sand grains contaminated with ferric oxide with (b) substantially dry gaseous hydrogen chloride until change in color of the sand grains substantially ceases, thereby indicating that the reaction which occurs is substantially complete, (II) washing the resulting sand with water and (III) subjecting the washed sand to froth flotation using an anionic collecting agent.

3. A process for rendering high silica sand, containing ferric oxide as an impurity, suitable for glass-making which comprises (I) contacting at a temperature of at most 120° C. (a) dry washed sand grains contaminated with ferric oxide with (b) substantially dry gaseous hydrogen chloride until change in color of the sand grains substantially ceases, thereby indicating that the reaction which occurs is substantially complete, (II) washing the resulting sand with water and (III) subjecting the washed sand to froth flotation using an anionic collecting agent.

4. A process for rendering high silica sand, containing ferric oxide as an impurity, suitable for glass-making which comprises (I) contacting at a temperature within the range from 70° to 100° C. (a) dry washed sand grains contaminated with ferric oxide with (b) substantially dry gaseous hydrogen chloride until change in color of the sand grains substantially ceases, thereby indicating that the reaction which occurs is substantially complete, (II) washing the resulting sand with water and (III) subjecting the washed sand to froth flotation using an anionic collecting agent.

5. A process for removing ferruginous impurities from high silica sand in order to render it suitable for glass-making which comprises (I) simultaneously contacting at a temperature within the range from room temperature to 100° C. (a) substantially dry, washed sand grains contaminated with ferric oxide, with (b) hydrochloric acid and with (c) sulphuric acid of at least 90% concentration, the weight of water derivable from the hydrochloric acid being at most 30% of the weight of the sulphuric acid, whereby the hydrochloric acid and the sulphuric acid generate dry gaseous hydrogen chloride in situ, until change in color of the sand grains substantially ceases, thereby indicating that the reaction which occurs is substantially complete, and (II) subjecting the washed sand to froth flotation using an anionic collecting agent.

6. A process for removing ferruginous impurities from high silica sand in order to render it suitable for glass-making which comprises (I) simultaneously contacting at a temperature within the range from 60° to 100° C. (a) substantially dry, washed sand grains, contaminated with ferric oxide, with (b) hydrochloric acid and with (c) sulphuric acid of at least 90% concentration, the weight of water derivable from the hydrochloric acid being at most 30% of the weight of the sulphuric acid, whereby the hydrochloric acid and the sulphuric acid generate dry gaseous hydrogen chloride in situ, until change in color of the sand grains substantially ceases, thereby indicating that reaction which occurs is substantially complete, and (II) subjecting the washed sand to froth flotation using an anionic collecting agent.

7. A process for removing ferruginous impurities from high silica sand in order to render it suitable for glass-making which comprises (I) simultaneously contacting at a temperature within the range from room temperature to 100° C. (a) substantially dry, washed sand grains, contaminated with ferric oxide, with (b) hydrochloric acid and with (c) sulphuric acid of at least 90% concentration, the weight of water derivable from the hydrochloric acid being at most 25% of the weight of the sulphuric acid, calculated as 98% acid, whereby the hydrochloric acid and the sulphuric acid generate dry gaseous hydrogen chloride in situ, until change in color of the sand grains substantially ceases, thereby indicating that the reaction which occurs is substantially complete, and (II) subjecting the washed sand to froth flotation using an anionic collecting agent.

8. In rendering high silica sand grains, contaminated with ferric oxide, suitable for glass-making, the steps of (I) contacting at a temperature below 250° C. dry grains of washed high silica sand contaminated with ferric oxide with substantially dry gaseous hydrogen chloride until change in color of the sand grains substantially ceases, thereby indicating that the reaction which occurs is substantially complete, and (II) thereafter washing the resulting grains with water.

9. In rendering high silica sand grains, contaminated with ferric oxide, suitable for glass-making, the steps of (I) contacting in an enclosed zone at a temperature below 200° C., substantially dry grains of washed high silica sand, contaminated with ferric oxide, with substantially dry gaseous hydrogen chloride until change in color of the sand grains substantially ceases, thereby indicating that the reaction which occurs is substantially complete, (II) washing the reacted grains with water and (III) subjecting the washed sand to froth flotation using an anionic collecting agent.

10. In the purification of high silica sand grains contaminated with ferric oxide, the steps of (I) simultaneously contacting at a temperature from room temperature to 100° C. (a) substantially dry grains of washed high silica sand contaminated with ferric oxide with (b) hydrochloric acid and with (c) sulphuric acid of at least 90% concentration, the weight of water derivable from the hydrochloric acid being at most 30% of the weight of the sulphuric acid, whereby the hydrochloric acid and the sulphuric acid generate dry gaseous hydrogen chloride in situ, until change in color of the sand grains substantially ceases, thereby indicating that the reaction which occurs is substantially complete, (II) washing the reacted grains with water and (III) subjecting the washed sand to froth flotation using an anionic collecting agent.

References Cited in the file of this patent

UNITED STATES PATENTS

| | | |
|---|---|---|
| 1,897,638 | Hubbell | Feb. 14, 1933 |
| 1,983,270 | Earle | Dec. 4, 1934 |
| 2,070,161 | Flinn | Feb. 9, 1937 |
| 2,233,155 | Adams | Feb. 25, 1941 |
| 2,381,843 | Sherlock | Aug. 7, 1945 |
| 2,614,906 | Spialter et al. | Oct. 21, 1952 |
| 2,663,650 | Iler | Dec. 22, 1953 |
| 2,701,640 | Duke et al. | Feb. 8, 1955 |

FOREIGN PATENTS

| | | |
|---|---|---|
| 678,380 | Germany | July 14, 1939 |
| 596,093 | Germany | Apr. 26, 1934 |
| 462,213 | Great Britain | Mar. 4, 1937 |
| 505,178 | Great Britain | May 2, 1939 |
| 652,890 | Great Britain | May 2, 1951 |

OTHER REFERENCES

Putnoky, L., et al.: "Chemical Abstracts," vol. 27, page 4047(4), 1933, "Removal of Iron from Hungarian Sands."

Jacobson: "Encyclopedia of Chemical Reaction," vol. IV, 1951, page 106, Reaction IV–424.